(12) United States Patent
Mendiratta et al.

(10) Patent No.: US 11,108,911 B2
(45) Date of Patent: Aug. 31, 2021

(54) SYSTEM AND METHOD FOR FLEXIBLE ROUTING

(71) Applicant: Avaya Inc., Santa Clara, CA (US)

(72) Inventors: Harsh V Mendiratta, East Brunswick, NJ (US); Tibor Lukac, Superior, CO (US)

(73) Assignee: Avaya Inc., Santa Clara, CA (US)

( * ) Notice: Subject to any disclaimer, the term of this patent is extended or adjusted under 35 U.S.C. 154(b) by 100 days.

(21) Appl. No.: 16/230,516

(22) Filed: Dec. 21, 2018

(65) Prior Publication Data

US 2020/0028968 A1    Jan. 23, 2020

Related U.S. Application Data

(60) Provisional application No. 62/699,058, filed on Jul. 17, 2018.

(51) Int. Cl.
*H04M 3/00* (2006.01)
*H04M 3/523* (2006.01)
(Continued)

(52) U.S. Cl.
CPC ...... *H04M 3/5238* (2013.01); *H04L 65/1069* (2013.01); *H04M 3/493* (2013.01);
(Continued)

(58) Field of Classification Search
CPC ............ H04M 3/5238; H04L 65/1069; H04L 65/1006
(Continued)

(56) References Cited

U.S. PATENT DOCUMENTS 6,985,961 B1    1/2006   Ramsayer et al.
2006/0018453 A1*  1/2006   Zhakov ............... H04M 3/56
                                                      379/219
(Continued)

FOREIGN PATENT DOCUMENTS

CN    101371535    2/2009
CN    102726023    10/2012
(Continued)

OTHER PUBLICATIONS

"3rd Generation Partnership Project; Technical Specification Group Core Network and Terminals; Customised Applications for Mobile network Enhanced Logic (CAMEL) Phase 4; Stage 2 (Release 15)," 3GPP Standard, Technical Specification, 3GPP TS 23.078, 3rd Generation Partnership Project (3GPP), vol. CT WG4, No. V15.0.0, Jun. 22, 2018, pp. 1-750.
(Continued)

*Primary Examiner* — William J Deane, Jr.
(74) *Attorney, Agent, or Firm* — Sheridan Ross P.C.

(57) ABSTRACT

A request to establish a communication session with a second communication device is received. The request to establish the communication session comprises one or more routing attributes for routing the communication session. The one or more routing attributes for routing the communication session are looked up in a dynamic routing framework. The communication session is routed to a third communication device or destination instead of the second communication device based on the one or more routing attributes and one or more rules defined in the dynamic routing framework. For example, the communication session is routed to a specific contact center queue based on the routing attribute instead of initially being routed to an Interactive Voice Response (IVR) system.

19 Claims, 6 Drawing Sheets

(51) Int. Cl.
*H04L 29/06* (2006.01)
*H04M 3/493* (2006.01)
*H04M 3/51* (2006.01)

(52) U.S. Cl.
CPC ....... *H04M 3/5166* (2013.01); *H04M 3/5191* (2013.01); *H04M 3/5232* (2013.01); *H04L 65/1006* (2013.01); *H04L 65/1009* (2013.01)

(58) Field of Classification Search
USPC ....... 379/265.01–265.14, 266.01–266.1, 309
See application file for complete search history.

(56) References Cited

U.S. PATENT DOCUMENTS

| | | | | |
|---|---|---|---|---|
| 2007/0168421 | A1* | 7/2007 | Kalyanpur | H04L 65/1043 709/204 |
| 2008/0162701 | A1* | 7/2008 | Ryabchun | H04L 67/306 709/227 |
| 2008/0240376 | A1* | 10/2008 | Conway | H04M 3/42221 379/211.01 |
| 2009/0129296 | A1* | 5/2009 | Grinshpun | H04L 65/1083 370/261 |
| 2009/0196183 | A1* | 8/2009 | Kakadia | H04L 41/5087 370/237 |
| 2010/0034079 | A1* | 2/2010 | Boucadair | H04L 29/12783 370/218 |
| 2010/0142515 | A1* | 6/2010 | Jana | H04L 65/1069 370/352 |
| 2011/0026517 | A1* | 2/2011 | Capuozzo | H04M 3/42323 370/352 |
| 2011/0264746 | A1* | 10/2011 | Yin | H04L 69/28 709/206 |
| 2012/0250497 | A1* | 10/2012 | Boizard | H04L 65/1006 370/218 |
| 2013/0016822 | A1* | 1/2013 | Vendrow | H04M 3/42229 379/211.01 |
| 2013/0036189 | A1* | 2/2013 | Stevens, III | H04L 65/1006 709/217 |
| 2013/0259026 | A1* | 10/2013 | Ross | H04L 65/1006 370/352 |
| 2014/0280808 | A1* | 9/2014 | Du | G06Q 10/0631 709/222 |
| 2014/0314215 | A1* | 10/2014 | Duva | H04M 3/51 379/88.01 |
| 2014/0359340 | A1* | 12/2014 | Hua | H04L 65/1016 714/4.11 |
| 2015/0039775 | A1* | 2/2015 | Benner | H04L 67/146 709/228 |
| 2015/0139045 | A1* | 5/2015 | Boyle | H04M 3/58 370/271 |
| 2016/0112302 | A1* | 4/2016 | Macleod | H04L 45/22 370/351 |
| 2016/0142447 | A1 | 5/2016 | Mufti et al. | |
| 2016/0330108 | A1* | 11/2016 | Gillon | H04L 69/40 |
| 2017/0034351 | A1* | 2/2017 | Spievak | G06Q 30/0275 |
| 2017/0099323 | A1* | 4/2017 | Sandgren | H04L 69/40 |
| 2017/0155689 | A1 | 6/2017 | Blencowe et al. | |
| 2018/0124122 | A1* | 5/2018 | Anisimov | H04L 65/1096 |

FOREIGN PATENT DOCUMENTS

| | | |
|---|---|---|
| JP | 2002-335267 | 11/2002 |
| JP | 2004-328535 | 11/2004 |
| JP | 2007-194721 | 8/2007 |
| JP | 2007-274160 | 10/2007 |
| JP | 2009-105831 | 5/2009 |
| JP | 2016-082507 | 5/2016 |

OTHER PUBLICATIONS

Rosenberg et al. "SIP: Session Initiation Protocol," Network Working Group, Jun. 2002, RFC 3261, 269 pages.
Sparks et al. "Session Initiation Protocol (SIP) Call Control—Transfer," Network Working Group, RFC 5589, 58 pages.
Extended Search Report for European Patent Application No. 19186277.0, dated Oct. 15, 2019 10 pages.
Official Action for India Patent Application No. 201914027488, dated Nov. 27, 2020 6 pages.
Official Action with Machine Translation for Japan Patent Application No. 2019-131597, dated Jun. 4, 2020 10 pages.
Official Action (with English translation) for China Patent Application No. 201910642929.7, dated Apr. 26, 2021 21 pages.
Official Action for European Patent Application No. 19186277.0, dated May 10, 2021 5 pages.
Official Action with Machine Translation for Japan Patent Application No. 2019-131597, dated Jun. 1, 2021 5 pages.

* cited by examiner

SYSTEM AND METHOD FOR FLEXIBLE ROUTING

CROSS REFERENCE TO RELATED APPLICATION

The present application claims the benefits of U.S. Provisional Application Ser. No. 62/699,058, filed Jul. 17, 2018, entitled "FLEXIBLE ROUTING", which is incorporated herein by this reference in its entirety.

FIELD

The disclosure relates generally to communication systems and particularly to flexible routing frameworks for communication systems.

BACKGROUND

Contact centers (CC) and other unified communications (UC) businesses are struggling today with limitations imposed by hard coded routing frameworks that are used to route incoming communication sessions. Today's solutions lack the flexibility that customers are demanding for creative and complex routing. As technology advances, so too must the solutions evolve to provide the capabilities that provide a more flexible routing framework.

SUMMARY

These and other needs are addressed by the various embodiments and configurations of the present disclosure. A request to establish a communication session with a second communication device is received. The request to establish the communication session comprises one or more routing attributes for routing the communication session. The one or more routing attributes for routing the communication session are looked up in a dynamic routing framework. The communication session is routed to a third communication device or destination (e.g., a software application) instead of the second communication device based on the one or more routing attributes and one or more rules defined in the dynamic routing framework. For example, the communication session is routed to a specific contact center queue based on the routing attribute instead of initially being routed to an Interactive Voice Response (IVR) system.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other SIP RFCs describing SIP are hereby incorporated by reference in their entirety for all that they teach.

As defined herein and in the claims, a "communication session" can be any type of communication session, such as a voice, video, multimedia, gaming, virtual reality, Instant Messaging (IM), email, text messaging, web interaction, and/or the like.

The term "communication device" may be any kind of communication device. For example, a communication device may be a user communication device (e.g., a smartphone, desktop computer, notepad, etc.) or may be a non-user communication device, such as router, a network element, an Automatic Call Distribution (ACD) system, a mail server, an IM session manager, a communication manager, an IVR system, a contact center queue, a contact center pool, a video/voicemail system, a communication bot, a web server, and/or the like.

As defined herein and in the claims, the term "routing attribute" can be or may include any type of attribute that is used to change/modify how a communication session is routed. A routing attribute may comprise a resource, such as a contact center queue, an Interactive Voice Response (IVR) system, a video/voicemail system, and/or the like. A routing attribute may be a specific header, a specific attribute(s) in a header, an attachment (e.g., an attached XML document in a SIP header), a specific value/parameter in a payload, and/or the like. For example, the routing attribute may be in a specific header, such as a SIP Via header, a SIP Contact header, a SIP Record-Route header, a SIP Refer-To header, and/or the like. In addition to SIP, other headers/attributes may be used, such as, Session Description Protocol attributes (e.g., a specific type of defined codec in a Session Description Protocol message), H.323, headers/attributes, video protocol headers/attributes, Web Real-Time Communication (WebRTC) protocol headers/attributes, proprietary headers/attributes, Instant Messaging protocol headers/attributes, Simple Mail Transfer Protocol headers/attributes, and/or the like. The routing attributes may include a specific sequence of attributes (e.g., A+!B+C=a specific routing behavior) or any combination of logical operators.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
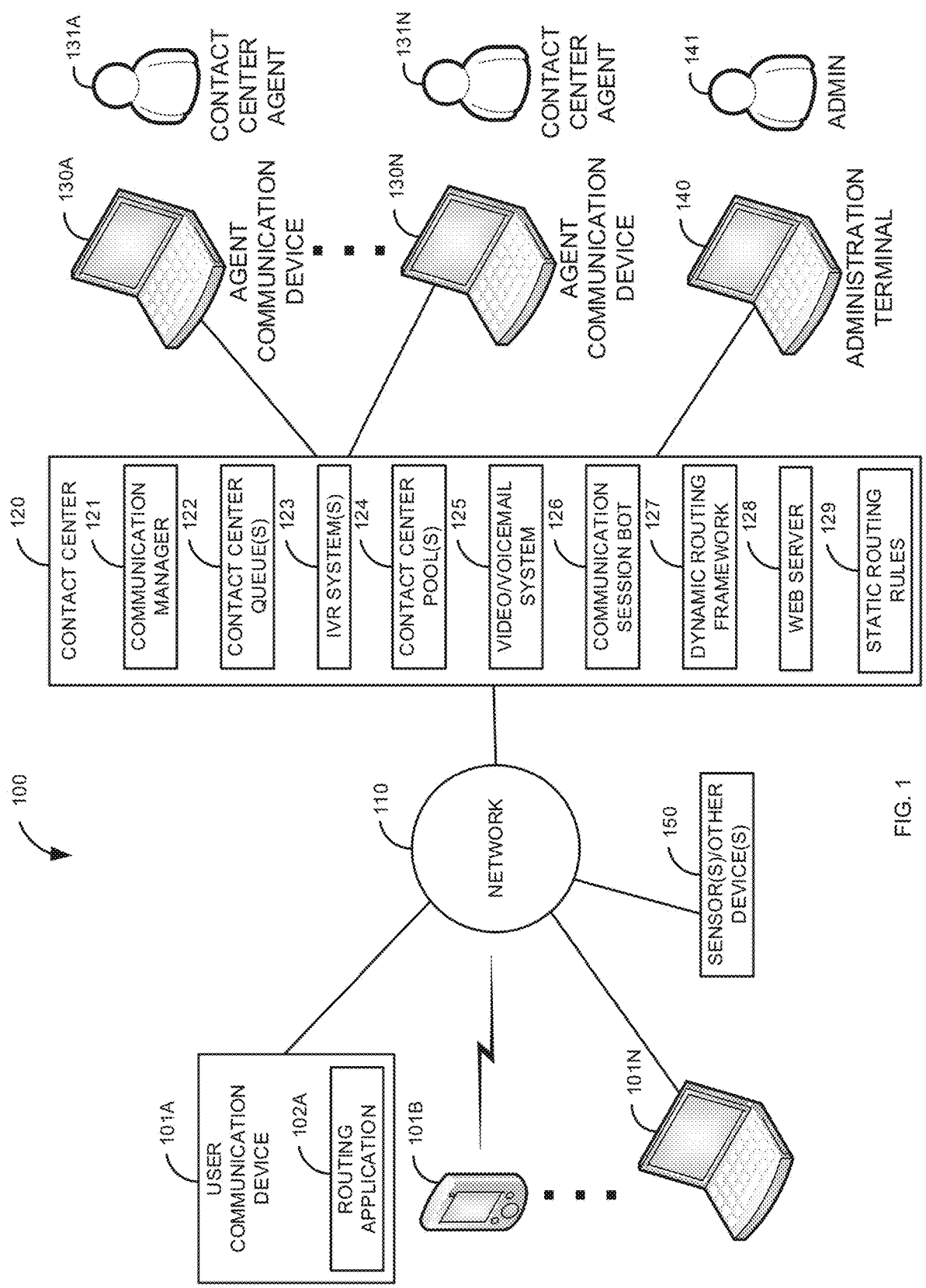
FIG. 1 is a block diagram of a first illustrative system for providing a flexible routing system.

FIG. 1 is a block diagram of a first illustrative system 100 for providing a flexible routing system. The first illustrative system 100 comprises user communication devices 101A-101N, a network 110, a contact center 120, agent communication devices 130A-130N, an administration terminal 140, and sensor(s)/other device(s) 150. In addition, contact center agents 131A-131N are shown at the agent communication devices 130A-130N and an administrator 141 is shown at the administration terminal 140.

The user communication devices 101A-101N can be or may include any user device that can communicate on the network 110, such as a Personal Computer (PC), a telephone, a video system, a cellular telephone, a Personal Digital Assistant (PDA), a tablet device, a notebook device, a smartphone, a conferencing system, and/or the like. As shown in FIG. 1, any number of user communication devices 101A-101N may be connected to the network 110, including only a single user communication device 101.

The user communication device 101A further comprises a routing application 102A. The routing application 102A can be or may include any firmware/software application that can be loaded onto the user communication device 101A. The routing application 102A can be used to insert and/or send routing parameter(s) and/or routing rule(s) to alter a route of a communication session in the contact center 120.

The routing application 102A may insert the routing parameter(s) and/or routing rule(s) at any time during the communication session into an existing message. For example, the routing application 102A may insert the routing parameter(s) and/or routing rules into a SIP INVITE message (at the initial establishment of the communication session). The routing parameter(s) and/or routing rule(s) in the SIP INVITE (or other SIP message) may be located in a request Uniform Resource Identifier (URI), in an attachment (e.g., an attached Extensible Markup Language (XML) document), a/SIP via header, in a SIP message body header, in a proprietary header, in a standard header, and/or the like.

The routing application 102A may dynamically send the routing parameter(s) and/or routing rule(s) by sending a message during the communication session. For example, the routing application 102A could send or modify a SIP NOTIFY, a SIP PUBLISH, a SIP REFER, a SIP INVITE, message, any SIP message type, and/or the like with the routing parameter(s) and/or routing rule(s) that change how a communication session is routed after the communication session is established. The SIP message that is sent/modified may occur based on a defined event. For example, a SIP REFER message may be modified with different routing parameters based on who the call is being transferred to. Although the user communication devices 101B-101N do not show a routing application 102 for convenience, the user communication devices 101B-101N may also comprise a corresponding routing application 102.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging (IM) protocols, email protocols, and the like. Thus, the network 110 is an electronic communication network configured to carry messages via packets and/or circuit switched communications.

The contact center 120 can be or may include any contact center 120 that can provide services to users of the user communication devices 101A-101N. The services may comprise various types of services, such as, technical support, sales, emergency services, and/or the like. A user may initiate (or receive) a communication session with the contact center 120 in various mediums, such as in, a voice communication session, a video communication session, a multimedia communication session, a virtual reality communication session, an Instant Messaging (IM) communication session, an email communication session, a text message communication session, and/or the like.

The contact center 120 further comprises a communication manager 121, contact center queue(s) 122, Interactive Voice Response (IVR) system(s) 123, contact center pool(s) 124, a video/voicemail system 125, a communication session bot 126, a dynamic routing framework 127, a web server 128, and static routing rules 129.

The communication manager 121 can be or may include any hardware coupled with firmware/software that can manage and route communication sessions in the contact center 120, such as a Private Branch Exchange (PBX), and Automatic Call Distribution (ACD) system, a router, a network switch, an IM server, an email server, and/or the like. The communication manager 121 can manage and route various types of communication sessions, such as, voice, video, multimedia, virtual reality, IM, email, text messaging, and/or the like.

The contact center queue(s) 122 can be or may include any computer construct that can be used to hold communication sessions. For example, the contact center queue(s) 122 can be used to hold voice communication sessions that are eventually routed to the agent communication device 130/contact center agent 131. The contact center queue(s) 122 can hold any kind of communication session.

The IVR system(s) 123 can be or may include any system that can interact with a user via voice. The IVR system(s) 123 may be used to gather information from users to make routing decisions in the contact center 120. For example, the IVR system(s) 123 may be used to route an incoming video communication session to a contact center queue 122 or contact center pool 124.

The contact center pool(s) 124 can be or may include any computer construct that can hold a communication until selected by a contact center agent 131. The contact center pool(s) 124 can hold any kind of communication sessions.

The video/voicemail system 125 can be or may include any hardware coupled with software that allows a user to leave a video or voicemail.

The communication session bot 126 can be or may include any hardware coupled with software that can interact with a user via text, such as, a chat bot, a text messaging bot, a web server bot, and/or the like.

The dynamic routing framework 127 can be or may include any set of rules that define routing of communication sessions. The dynamic routing framework 127 can be dynamically defined by the administrator 141 via the administration terminal 140.

The web server 128 can be or may include any known web server 128, such as Apache™, IIS™, Nginx™, and/or the like. The web server 128 may provide the routing application 102 to the user communication device 101 via a browser.

The static routing rules 129 can be or may include routing rules that are predefined or administered in the contact center 120. The static routing rules 129 are based on the initial routing capabilities of the contact center 120.

The agent communication devices 130A-130N can be or may include any user communication device, such as the user communication device 101. In one embodiment, an agent communication device (e.g., 130A) may comprise multiple agent communication devices 130, such as a telephone and a personal computer.

The sensor(s)/other device(s) 150 can be or may include any sensor/device that can establish a communication session, such as a camera, an RFID scanner, a pressure sensor, a document scanner, a router, a server, a communication system, an alarm system, a microphone, and/or the like. Although not shown, the sensor(s)/other devices 150 may also comprise a routing application 102.

Figure 2:
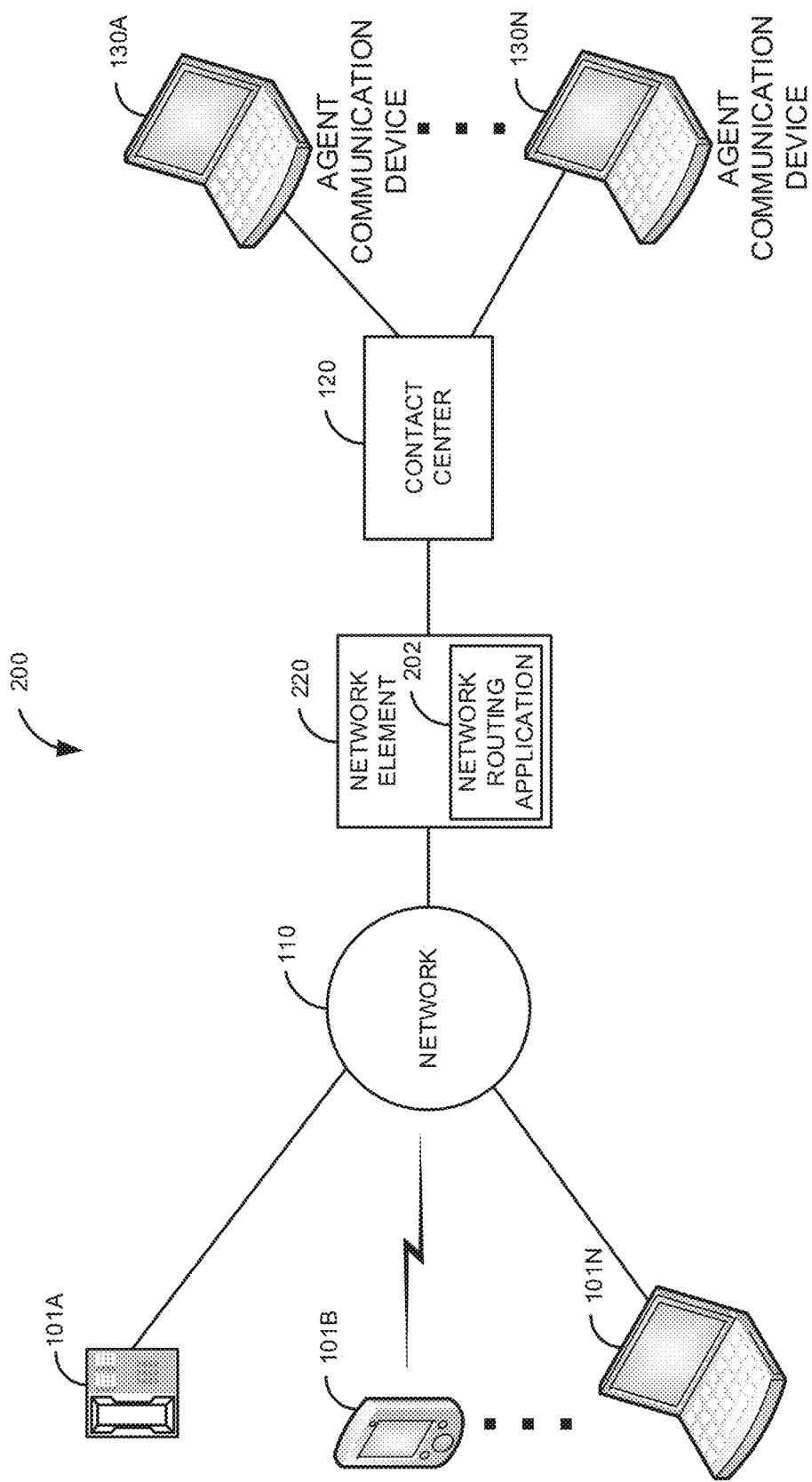
FIG. 2 is a block diagram of a second illustrative system for providing a flexible routing system using a network element.

FIG. 2 is a block diagram of a second illustrative system 200 for providing a flexible routing system using a network element 220. FIG. 2 comprises the user communication devices 101A-101N, the network 110, the contact center 120, the agent communication devices 130A-130N and a network element 220. Although not shown for convenience, the second illustrative system 200 may also comprise the administration terminal 140. Likewise, the contact center agents 131A-131N and the administrator may be users of the second illustrative system 200.

The network element 220 can be or may include any network element that can manage communication sessions, such as, a router, a session manager, an Automatic Call Distributer (ACD), a Session Border Controller (SBC), a proxy server, and/or the like. The network element 220 further comprises a network routing application 202. The network routing application 202 can be any application that can intercept and manage a communication session, such as, a Back-to-Back User Agent (B2BUA).

In one embodiment of FIG. 2, the routing application 102 is not in the user communication devices 101A-101N. Instead, the functionality of the routing application 102 is in the network routing application 202. In FIG. 2, the network routing application 202 can insert and/or send routing attribute(s) and/or routing rule(s) that change how communication sessions (i.e., from any of the user communication device 101A-101N) are routed in the contact center 120. The network routing application 202 may insert and/or send the routing attribute(s)/routing rule(s) in the same manner as discussed for the routing application 102A. Likewise, the network routing application 202 may use machine learning in a similar manner as described for the routing application 102A.

In one embodiment of FIG. 2, both the routing application 102 and the network routing application 202 may each insert and/or send routing parameter(s) and/or routing rule(s) for a single communication session. In other words, the routing application 102 and the network routing application 202 are a distributed routing application 102/202.

Figure 3:
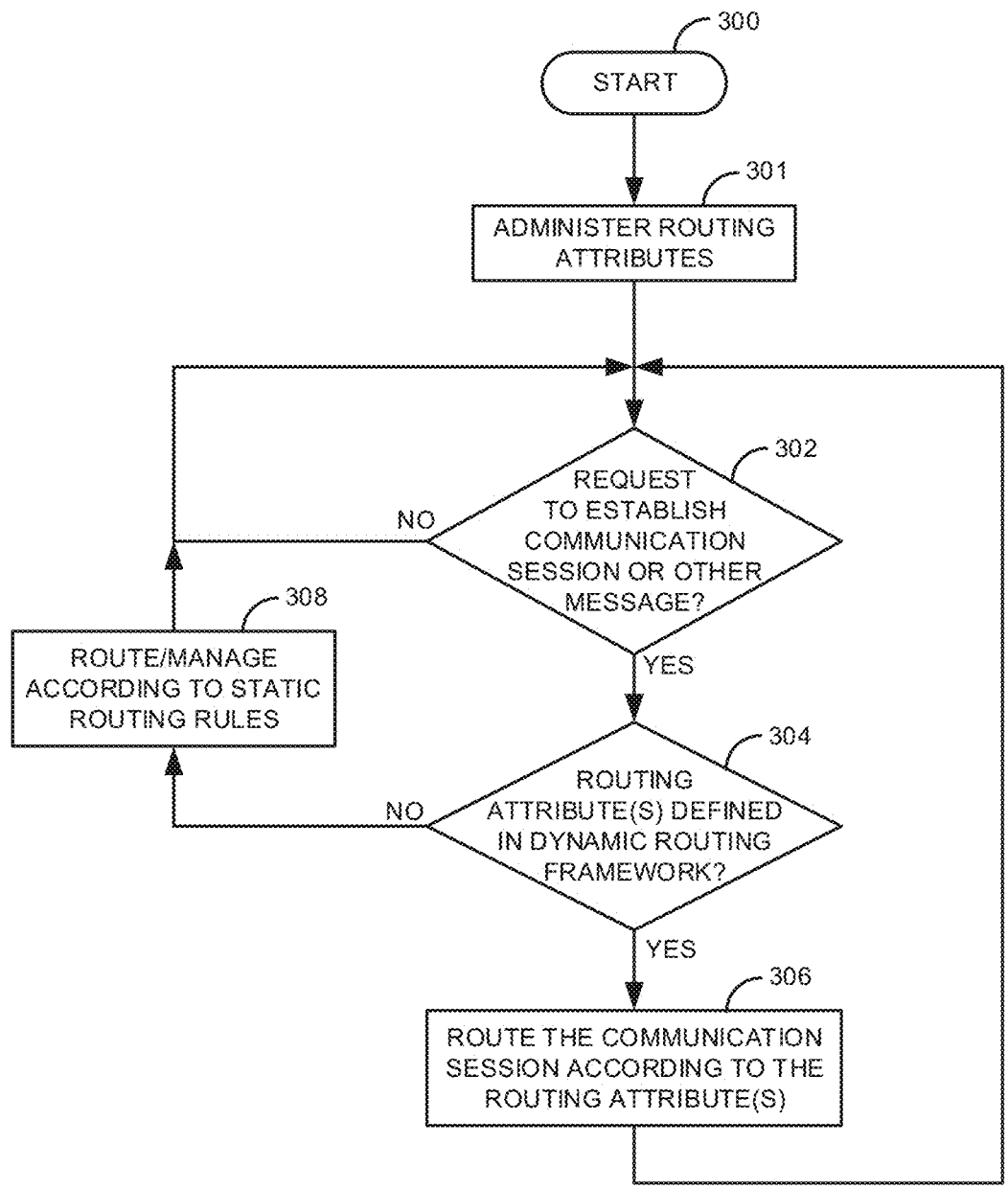
FIG. 3 is a flow diagram of a process for providing a flexible routing system using routing attributes.

FIG. 3 is a flow diagram of a process for providing a flexible routing system using routing attributes. Illustratively, the user communication devices 101A-101N, the routing application 102, the contact center 120, the communication manager 121, the contact center queue(s) 122, the IVR system(s) 123, the contact center pool(s) 124, the video/voicemail system 125, the communication session bot 126, the dynamic routing framework 127, the web server 128, the agent communication devices 130A-130N, the administration terminal 140, the sensor(s)/device(s) 150, the network element 220, and the network routing application 202 are stored-program-controlled entities, such as a computer or microprocessor, which performs the method of FIGS. 3-6 and the processes described herein by executing program instructions stored in a computer readable storage medium, such as a memory (i.e., a computer memory, a hard disk, and/or the like). Although the methods described in FIGS. 3-6 are shown in a specific order, one of skill in the art would recognize that the steps in FIGS. 3-6 may be implemented in different orders and/or be implemented in a multi-threaded environment. Moreover, various steps may be omitted or added based on implementation.

Normally, when the user initiates a communication session to the contact center 120, the user typically dials a 1-800 number, uses a general email address, uses an IM address of the contact center 120, etc. In each of these cases the initial routing address/number is not the final destination of the communication session. Typically it may take several steps for a user to navigate through the contact center 120 in order for the user to be connected to their final destination. For example, the user may dial a 1-800 number that is the address of an Automatic Call Distribution (ACD) system (the communication manager 121). The ACD system then routes the communication session to the IVR system 123. Based on input from the user, the user is routed to the contact center queue 122, which eventually connects the user with a contact center agent 131. In many cases this statically defined process is inefficient. The use of routing attributes as discussed in FIG. 3 allows for a simplified process for reaching the intended destination of a communication session.

Likewise, in a non-contact center environment, the process described in FIG. 3 may be used to change how an initial communication session is routed. For example, an incoming voice communication session to an individual user may be routed to a different user/device based on the use of routing attributes as described in FIG. 3. In addition, a communication may be with a sensor/device 150. For example, a remote alarm system/camera system may initiate a communication session to the contact center 120.

The process starts in step 300. The administrator 141, via the administration terminal 140, administers, in step 301, the routing attributes for the dynamic routing framework 127. The administered routing attributes may be any type of routing attributes. The routing attribute(s) defined by the administrator 141 can be a single attribute. For example, if a message contains parameter/header A, the communication session may be rerouted to a different device. The routing attributes defined by the administrator 141 can be a specific sequence of attributes (e.g., A+!B+C=a specific routing behavior). For instance, if a message type is a SIP INVITE message, does not have a specific request URI, and contains the priority header "QueueRoute", then the message is routed to a specific contact center queue 122. The sequence of routing attributes can use any combination of logical operators, such as and, or, exclusive or, not, etc. The routing attribute defined by the administrator 141 may be based on a lack of a specific attribute(s). For example, if a message does not contain the parameter QueueRoute, the communication session routed to a specific IVR system 123. This flexibility allows the administrator to dynamically customize how a communication session is routed in any communication environment.

The defined routing attributes may be based on existing headers/parameters and/or new headers/parameters. For example, the defined routing attributes may be for a new proprietary header in a SIP INVITE message. Alternatively, the defined routing attributes may be for specific standard header(s)/parameter(s) in the SIP INVITE message.

In one embodiment, the dynamic routing framework 127 may not use the routing application 102/network routing application. In this embodiment, the administered routing attributes that are defined in the dynamic routing framework 127 use existing headers/parameters to alter how a communication session is normally routed.

The communication manager 121 waits to see if a request to establish a communication session (e.g., a SIP INVITE) or other message (e.g., a SIP NOTIFY, a SIP PUBLISH, a SIP REGISTER, a SIP NOTIFY, a SIP INFO, a SIP OPTIONS, a SIP UPDATE, a SIP re-INVITE, a SIP INVITE with replaces header message, etc.) is received in step 302. The received message of step 302 may be based on another type of protocol, such as, Hypertext Transport Protocol (HTTP), H.323, Web Real Time Protocol (WebRTC), and/or the like. If a request to establish a communication session or other message is not received in step 302, the process of step 302 repeats.

Otherwise, if there a request to establish a communication session or other message is received in step 302, the communication manager 121 looks to see, in step 304, if there are one or more routing attributes in the request to establish the communication session or other message that are defined in the dynamic routing framework 127. If there are not any routing attributes that are defined in the dynamic routing framework 127 in step 304, the communication manager 121 routes and/or manages the communication according to the static routing rules 129 of the contact center 120 in step 308. The process then goes to step 302.

If there are one or more routing attributes defined in the dynamic framework 127, the communication session is routed according the routing attributes in step 306 and the process then goes to step 302. For example, the communication session is routed to a different device (e.g., a different user communication device 101) or a different destination (e.g., a software application). The routing attribute(s) can be any type of routing attribute that can influence how a communication session is routed in the contact center 120. For example, the routing attribute may be a location of the user communication device 101 (e.g., route to a specific device/contact center 120 based on a location of the user communication device 101A and/or who the user is), a busyness of a contact center 120 (e.g., route to a specific device based on a busyness level of the contact center 120), a call wait time in a contact center queue 122 (route to the contact center queue 122 if the wait time is below a threshold), a time of day, an agent state of a specific contact center agent 131 (e.g., if the contact center agent 131 is on break), an Interactive Voice Response (IVR) system identifier, a menu identifier in the IVR system 123, an IVR menu set (e.g., a specific set of menus used by the IVR system 123), a Vector Directory Number (VDN), a language (e.g., route to an IVR system 123 based on a language setting), a dialect, a speed of the user communication device 101 (e.g., a processor speed or bandwidth capacities), a device type (e.g., mobile or non-mobile) of the user communication device 101, a screen size of the user communication device 101, a document displayed on a user communication device 101, an installed application on the user communication device 101, a running application on the user communication device 101, an agent skill, an agent skill level, a voicemail system identifier, a videomail system identifier, a contact center queue identifier, a priority level in the contact center queue 122, an move up number in the contact center queue 122 (e.g., move up six places in the contact center queue 122), a contact center pool identifier, an Instant Messaging bot identifier, a communication session bot identifier, a codec type (e.g., route to a contact center queue 122 that supports video calls if the codec type is for a video codec), a destination identifier, a media type (e.g., if the media type is voice or video, route to a specific contact center queue 122), and/or the like.

The routing attribute(s) may be used to fetch a rule(s) from a database and/or based on pattern matching. The rule from the database may then use one or more existing parameters in the message to route the communication session in the contact center. For example, a SIP INVITE message may have a caller's telephone number and a high priority queue routing parameter. Even though different SIP INVITE messages have the same high priority queue routing attribute, for caller A, the call may be routed to a first high priority contact center queue 122 and for caller B (based on a different telephone number) the call would be routed to a second high priority contact center queue 122.

In FIG. 3, the routing attributes are typically sent when a communication session is initiated. However, the routing attributes may be sent after the communication session is established. For example, the routing attributes may be sent when a communication session is transferred (e.g., in a SIP Re-INVITE message).

In one embodiment of FIG. 3, multiple separate headers may be used for the routing attributes. The multiple separate headers may be used to define a hierarchical set of routing attributes. For example, a routing parameter in a SIP URI may have priority over a routing parameter in a SIP message body header.

In one embodiment, the routing application 102A may insert and/or send the routing parameter(s) and/or routing rule(s) based on machine learning. A machine learning algorithm may be used to identify over time specific behaviors of a user for how a communication is typically routed. For example, the routing application 102A may learn (i.e., by itself or based on input from the contact center 120) that when user A initiates a voice call to the contact center 120, user A always gets connected to a specific contact center queue 122. When the user initiates a communication session to the contact center 120, based on the machine learning, the communication session may be directly routed to the contact center queue 122, to an IVR system 123 and provided limited set of menus (less than normally), and/or the like. In one embodiment, the routing application 102/202 may receive instructions from the dynamic routing framework 127 to insert specific routing parameter(s) and/or routing rule(s) into a request to establish a communication session or other message.

Figure 4:
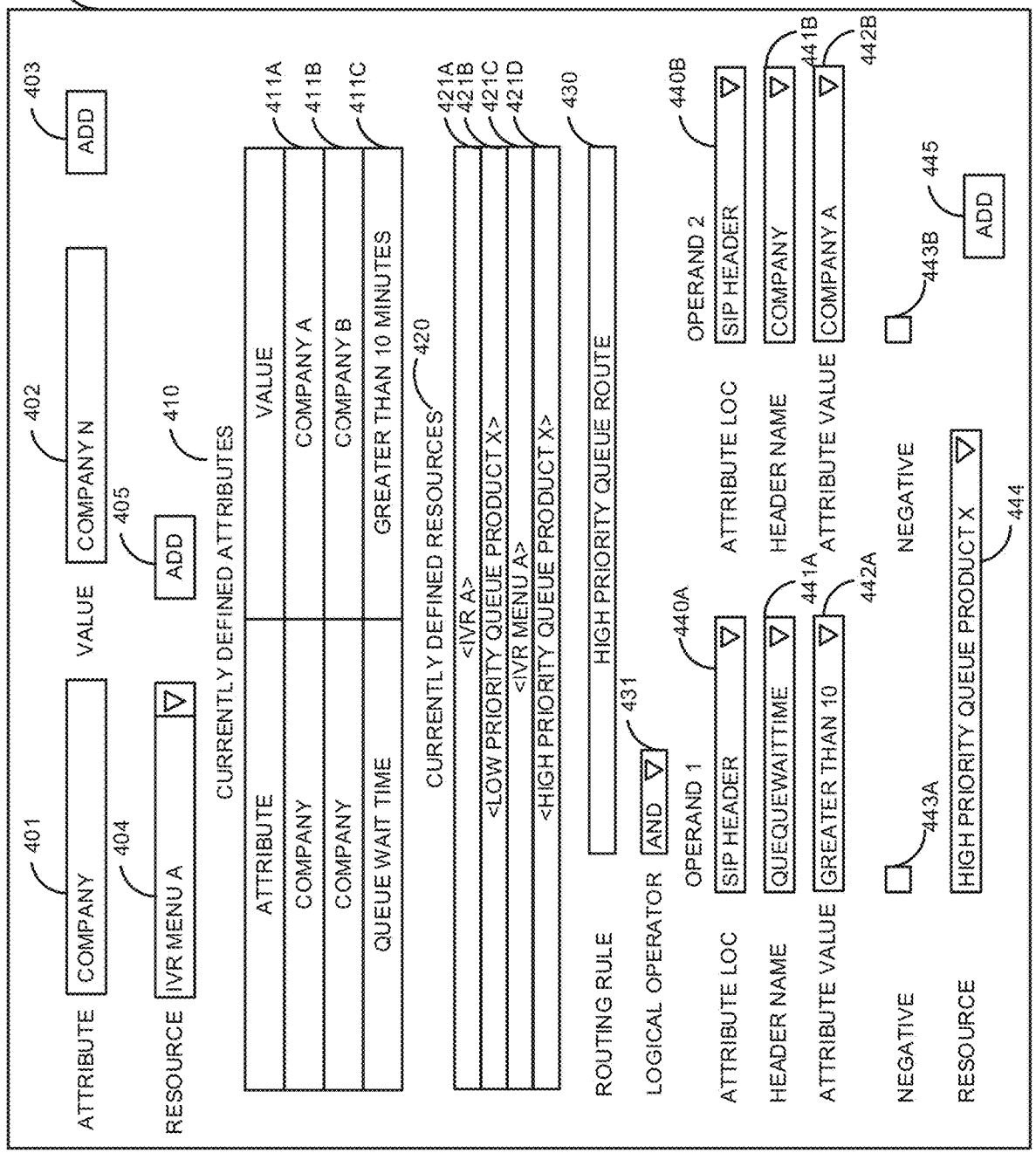
FIG. 4 is a diagram of an exemplary user interface for defining routing rules in a dynamic routing framework.

FIG. 4 is a diagram of an exemplary user interface for defining routing rules in a dynamic routing framework 127. FIG. 4 comprises a user interface 400. The user interface 400 comprises: an attribute field 401, a value field 402, an add attribute button 403, a resource field 404, an add resource button 405, a list of currently defined attributes 410, a company A attribute 411A, a company B attribute 411B, a queue wait time attribute 411C, a list of currently defined resources 420, an IVR A resource 421A, a low priority queue Product X resource 421B, an IVR menu A resource 421C, a high priority queue for product X resource 421D, a routing rule 430, a logical operator 431, an attribute location for operand 1 440A, an attribute location for operand 2 440B, an header name for operand 1 441A, an header name for operand 2 441B, an attribute value for operand 1 442A, an attribute value for operand 2 442B, a negative for operand 1 443A, a negative for operand 2 443A, a selected resource 444, and an add rule button 445.

The administrator 141, via the administration terminal 140, can add a routing attribute by entering the name of the attribute in the attribute field 401 and entering a value for the attribute in the value field 402. For example, as shown in FIG. 4, the administrator 141 has entered for the attribute "COMPANY" with a value of "COMPANY N." The administrator 141 can then select the add attribute button 403 to add the new routing attribute to the list of currently defined attributes 410.

The administrator 141 can then select a resource (also a routing attribute) in the resource field 404. For example, a resource may be the contact center queue 122, the IVR system 123, the contact center pool 124, the videomail system 125, the communication bot 126, the web server 128, and/or the like. In FIG. 4, the administrator 141 has selected the resource "IVR MENU A" 125. The administrator 141 can then add the selected resource to the list of currently defined resources 420 by selecting the add resource button 405.

The list of currently defined attributes comprises the company A attribute 411A, the company B attribute 411B, and the queue wait time attribute 411C. The company A attribute 411A has defined the value of "COMPANY A" for the attribute "COMPANY." The company B attribute 411B has defined the value of "COMPANY B" also for the attribute "COMPANY." In this example, the attribute "COMPANY" has two possible values "COMPANY A" and "COMPANY B." The queue wait time attribute 411C (QUEUE WAIT TIME) has a value of "GREATER THAN 10 MINUTES."

The list of currently defined resources 430 comprises the IVR A resource 421A, the low priority queue Product X resource 421B, the IVR menu A resource 421C, and the high priority queue for product X resource 421D.

The administrator 141 can define the name of a routing rule by entering the name in the routing rule 430. The administrator 141 can define a logical operator 431 for the routing rule 430. In this example, the administrator 141 has selected the logical operator "AND." The logical operator 431 is for the operands 1-2. For operand 1, the administrator 141 has selected the attribute type 440A to be in a SIP header. The routing attribute may be identified by the administrator 141 to be in a different header. For example, the routing attribute may reside in a Session Description Protocol attribute (e.g., a specific type of codec). If there is only a single operand to be used, the administrator may select "NONE" for the logical operator 431.

The administrator 141 then defines what specific SIP header(s) (or any place in the message) the routing parameter(s) will be in. In this example, the administrator 141 has identified the proprietary SIP header named queue wait time in the header name field for operand 1 441A. The administrator 141 has identified a proprietary SIP header with the name of company in the header field for operand 1 441B.

The administrator 141 then selects the attribute value. In this example, the administrator 141 has selected that the queue wait time header has an attribute value of greater than 10 in the attribute value for operand 1 442A. The administrator 141 has also selected that the attribute value for operand 2 442B is company A.

The administrator 141 can select the negative for operand 1 443A to indicate a NOT operator for the queue wait time attribute for operand 1 441A. The administrator 141 can also select the negative for operand 2 443B to indicate a NOT operator for the company B attribute 411B. Based on the defined routing attributes, the administrator can select a resource 444 for the routing rule. In this example, the administrator 141 has selected the high priority queue for product X 421D. Once the administrator 141 has sets the fields 430, 431, and 440-444, the administrator 141 can then add the routing rule by selecting the add rule button 445. For multi-instance headers the administrator can specific which instance of the header (any or all) to look for the attribute 411 in.

Based on a simple syntax of the defined rules, the administrator 141 can dynamically define routing rules that were previously unsupported by the contact center 120 (or any routing system). The dynamic routing framework 127 allows for a robust and dynamic routing capabilities that were not achievable with the prior art.

Figure 5:
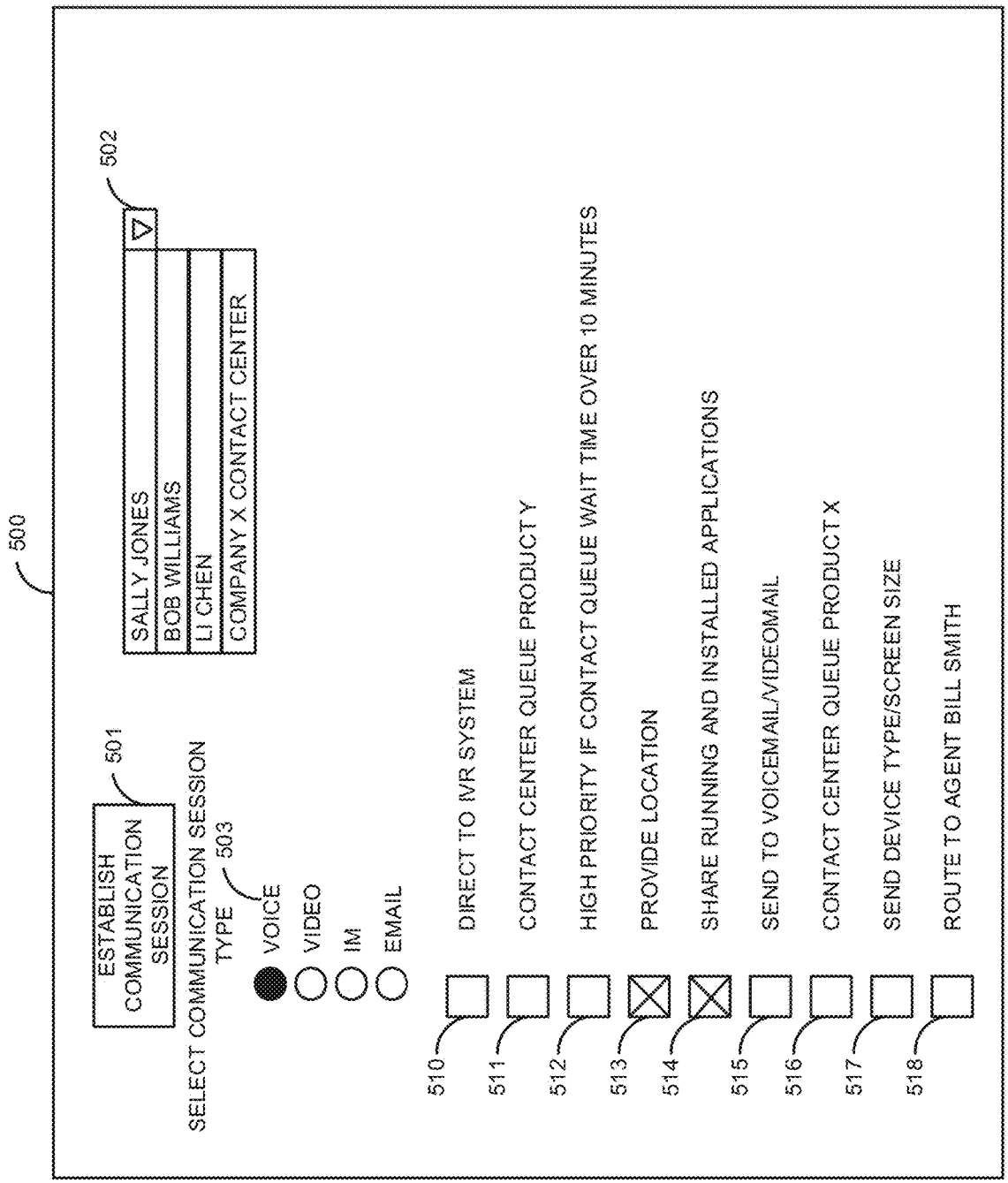
FIG. 5 is a diagram of a user interface that provides a flexible routing system in a contact center.

FIG. 5 is a diagram of a user interface 500 that provides a flexible routing system in a contact center 120. FIG. 5 comprises the user interface 500. The user interface 500 comprises an establish communication session button 501, a list of users 502, a select communication session type radio button 503, a direct to IVR system checkbox 510, a contact center queue product Y checkbox 511, a high priority of contact center queue wait time over 10 minutes checkbox 512, a provide location checkbox 513, a share running and installed applications checkbox 514, a send to voicemail/videomail checkbox 515, a contact center queue Product X checkbox 516, a send device type/screen size checkbox 517, and a route to agent Bill Smith checkbox 518.

The direct to IVR system checkbox 510 causes a routing parameter to be inserted and/or sent to the dynamic routing framework 127 that is used to route the communication session to the IVR system 123. The contact center queue product Y checkbox 511 causes a routing parameter to be inserted and/or sent to the dynamic routing framework 127 that is used to route the communication session to the contact center queue 122 for Product Y. The high priority of contact center queue wait time over 10 minutes checkbox 512 causes a routing parameter to be inserted and/or sent to the dynamic routing framework 127 that is used to route the communication session to the high priority contact center queue 122 if there is a wait time over 10 minutes in normally designated contact center queue 122. The provide location checkbox 513 causes a location routing parameter to be inserted and/or sent to the dynamic routing framework 127 that is used to route the communication session based on a location of the user communication device 101.

The share running and installed applications checkbox 514 causes a routing parameter(s) to be inserted and/or sent to the dynamic routing framework 127 that are used to route the communication session based on what applications that the user has installed or is running on the user communication device 101. For example, if the user has a PDF viewer that is installed on the user communication device 101, the routing parameter may cause the communication session to switch from audio to video so that a contact center agent 131 can send a PDF document that is automatically displayed to the user. The send to voicemail/videomail checkbox 515 causes a routing parameter to be inserted and/or sent to the dynamic routing framework 127 that is used to route a voice or video communication session to video/voicemail system 125.

The contact center queue Product X checkbox 516 causes a routing parameter to be inserted and/or sent to the dynamic routing framework 127 that is used to route the communication session to the contact center queue 122 for Product X. The send device type (e.g., smart phone, desktop computer, etc.)/screen size checkbox (e.g., small/large) 517 causes a one or more routing parameters to be inserted and/or sent to the dynamic routing framework 127 that are used to route the communication session based on the device type and/or screen size of the user communication device 101. The route to agent Bill Smith checkbox 518 causes a routing parameter to be inserted and/or sent to the dynamic routing framework 127 that is used to route the communication session directly to the agent communication device 130 of the contact center agent 131 Bill Smith.

When the user wants to establish a communication session with the contact center 120, the user selects a user(s) from the list of users 502, selects a communication session type from the select communication session type radio button 503 (voice in this example), and then selects one or more of the checkboxes 510-518. Based on what is selected, other options of the checkboxes 510-518 may not be selectable. As shown in FIG. 5, the user has selected the provide location checkbox 513 and the share running and installed applications checkbox 514. The user then selects the establish communication session button 501 to establish the voice communication to the contact center 120.

Based on the selected checkboxes (513 and 514 in this example), the routing application 102 inserts and/or sends routing parameters (location, installed applications, and running applications) that are in the initial request to establish the voice communication session to the contact center 120. The initial request to establish the voice communication is typically sent using a 1-800 number (e.g., a number of an ACD system). Based on the routing parameters, instead of being sent to the ACD system, the voice call is routed based on the routing parameters (i.e., to a different communication device than the ACD system).

Figure 6:
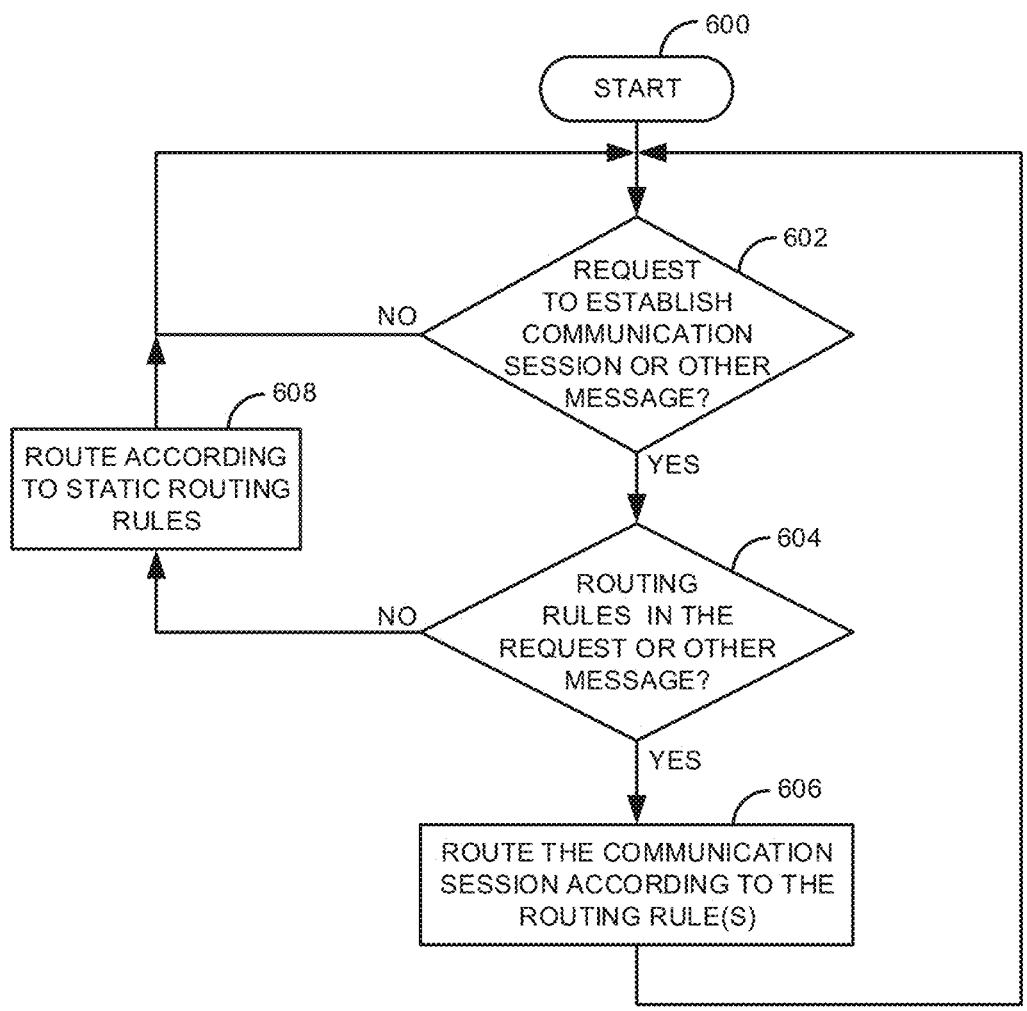
FIG. 6 is a flow diagram of a process for providing a flexible routing system using routing rules.

FIG. 6 is a flow diagram of a process for providing a flexible routing system using routing rules. The process starts in step 600. The communication manager 121 waits to see if a request to establish a communication session (e.g., a SIP INVITE) or other message (e.g., a SIP NOTIFY, a SIP PUBLISH, a SIP REGISTER, a SIP NOTIFY, a SIP INFO, a SIP OPTIONS, a SIP INVITE, etc.) is received in step 602. If a request to establish a communication session or other message is not received in step 602, the process of step 602 repeats.

Otherwise, if there a request to establish a communication session or other message is received in step 602, the communication manager 121 looks to see if there are one or more routing rules in the request to establish the communication session or other message in step 604. A routing rule may be any rule that changes how a communication session is routed in the contact center 120. For example, when a user calls into the ACD system using a 1-800 number, the routing rule(s) change the routing to another destination/device. For instance, the routing rule may state to route directly to the IVR system 123 and start playing a specific IVR menu if the contact center 120 has more than twenty calls on hold (e.g., a dynamic parameter of in a contact center queue 122). The routing rule may state that if there are more than five calls in the low priority queue for Product X to route the call to the high priority queue for Product X. A routing rule may be similar to the routing rules defined in the list of currently defined resources 430. A routing rule, based be based on various factors, such as an and, an or, a exclusive or, a not, and/or the like. The difference between using a routing rule in FIG. 6 and routing parameters in FIG. 3 is that the routing rules do not need to be looked up in the dynamic routing framework 127.

In one embodiment of FIG. 6, multiple separate headers may be used for the routing rules. The multiple separate headers may be used to define a hierarchical set of routing rules. For example, a routing rule in a SIP via header may have priority over a routing rule in a SIP message body header.

If there are not any routing rules that are defined in request to establish the communication session or other message in step 604, the communication manager 121 routes and/or manages the communication according to the static routing rules 129 of the contact center 120 in step 608. The process then goes to step 602.

If there are one or more routing rules defined in the request to establish the communication session or other message, the communication session is routed according to the routing rules in step 606. The process then goes to step 602.

In FIG. 6, the routing rules are typically sent when a communication session is initiated. However, the routing rules may be sent after the communication session is established. For example, the routing rules may be sent when a communication session is transferred (e.g., in a SIP Re-INVITE message).

The processes described in FIGS. 1-6 are described where the communication session is routed in a contact center 120. However, the processes described in FIGS. 1-6 may work in a non-contact center environment. For example, the dynamic routing framework 127 may be used to route communication sessions in a corporate environment.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer memory device, coupled with the microprocessor and comprising microprocessor readable and executable instructions that, when executed by the microprocessor, cause the microprocessor to:
    receive a request to establish a first communication session with a second communication device, wherein the request to establish the first communication session comprises a first routing attribute for routing the first communication session;
    lookup the first routing attribute for routing the first communication session in a dynamic routing framework; and
    route the first communication session to a third communication device or destination based on the first routing attribute and one or more rules defined in the dynamic routing framework,
    wherein the third communication device or destination is identified based on the lookup of the first routing attribute.

2. The system of claim 1, wherein the microprocessor readable and executable instructions further cause the microprocessor to:
    receive, after the first communication session is established, a second message associated with the first communication session that contains a second routing attribute for routing the first communication session;
    lookup the second routing attribute for routing the first communication session in the dynamic routing framework;
    route the first communication session to a fourth communication device based on the second routing attribute and one or more rules defined in the dynamic routing framework.

3. The system of claim 1, wherein the first routing attribute of the first communication session defines a media type of the first communication session and wherein the microprocessor readable and executable instructions further cause the microprocessor to:
    identify, from a plurality of possible media types, the defined media type of the first communication session, wherein routing the first communication session to the third communication device or destination is based on the defined media type of the first communication session.

4. The system of claim 1, wherein the first routing attribute of the first communication session is an identifier of a company and wherein routing the first communication session to the third communication device or destination is based on the identifier of the company.

5. The system of claim 1, wherein the first routing attribute of the first communication session is one of: a location of a first communication device, a busyness of a contact center, a call wait time in a contact center queue, a time of day, an agent state of a specific contact center agent, an Interactive Voice Response (IVR) system identifier, a menu identifier in the IVR system, an IVR menu set, a Vector Directory Number (VDN), a language, a dialect, a speed of the first communication device, a device type of the first communication device, a screen size of the first communication device, a document displayed on the first communication device, an installed application on the first communication device, a running application on the first communication device, an agent skill, an agent skill level, a voicemail system identifier, a videomail system identifier, a contact center queue identifier, a priority level in the contact center queue, an move up number in the contact center queue, a contact center pool identifier, an Instant Messaging bot identifier, a communication session bot identifier, a codec type, a destination identifier, an attribute in a Session Initiation Protocol (SIP) header, and an attribute in a Session Description Protocol (SDP), an attribute in H.323, header, an attribute in a video protocol header, an attribute in a Web Real-Time Communication (WebRTC) protocol header, and an attribute in a proprietary header.

6. The system of claim 1, wherein a user interface displayed on a first communication device is used to select the first routing attribute and wherein the first routing attribute is inserted into the request to establish the first communication session with the second communication device.

7. The system of claim 1, wherein a network routing application is used to insert the first routing attribute into the request to establish the first communication session with the second communication device.

8. The system of claim 1, wherein the first routing attribute comprises a plurality of routing attributes that are in a plurality of headers in the request to establish the first communication session and wherein the plurality of headers define a hierarchical set of conditions that determine the routing of the first communication session to the third communication device or destination.

9. The system of claim 1, wherein the microprocessor readable and executable instructions further program the microprocessor to:
receive, from the at least one of a first communication device and a network routing application, a request to establish a second communication session with the second communication device, wherein the request to establish the second communication session defines a second routing attribute for routing the second communication session;
lookup the second routing attribute for routing the second communication session in the dynamic routing framework; and
route the second communication session to a fourth communication device based on the second routing attribute and the one or more rules defined in the dynamic routing framework.

10. The system of claim 1, wherein the routing attribute comprise a plurality of routing attributes and wherein one or more logical operators are used on the plurality of routing parameters to route the first communication session to the third communication device or destination.

11. A method comprising:
Receiving a request to establish a first communication session with a second communication device, wherein the request to establish the first communication session comprises a first routing attribute for routing the first communication session;
looking up the first routing attribute for routing the first communication session in a dynamic routing framework; and
routing the first communication session to a third communication device or destination based on the first routing attribute and one or more rules defined in the dynamic routing framework,
wherein the third communication device or destination is identified based on the looking up of the first routing attribute.

12. The system of claim 1, wherein the microprocessor readable and executable instructions further cause the microprocessor to:
determine the third communication device or destination after the lookup; and
establish the first communication session with the third communication device or destination,
wherein the third communication device or destination is unknown prior to the lookup.

13. The method of claim 11, wherein the routing attribute comprise a plurality of routing attributes and wherein one or more logical operators are used on the plurality of routing parameters to route the first communication session to the third communication device or destination.

14. The method of claim 11, wherein the first routing attribute of the first communication session is one of: a location of a first communication device, a busyness of a contact center, a call wait time in a contact center queue, a time of day, an agent state of a specific contact center agent, an Interactive Voice Response (IVR) system identifier, a menu identifier in the IVR system, an IVR menu set, a Vector Directory Number (VDN), a language, a dialect, a speed of the first communication device, a device type of the first communication device, a screen size of the first communication device, a document displayed on the first communication device, an installed application on the first communication device, a running application on the first communication device, an agent skill, an agent skill level, a voicemail system identifier, a videomail system identifier, a contact center queue identifier, a priority level in the contact center queue, an move up number in the contact center queue, a contact center pool identifier, an Instant Messaging bot identifier, a communication session bot identifier, a codec type, a destination identifier, an attribute in a Session Initiation Protocol (SIP) header, and an attribute in a Session Description Protocol (SDP), an attribute in H.323, header, an attribute in a video protocol header, an attribute in a Web Real-Time Communication (WebRTC) protocol header, and an attribute in a proprietary header.

15. The method of claim 11, wherein a user interface displayed on a first communication device is used to select the first routing attribute and wherein the first routing attribute is inserted into the request to establish the first communication session with the second communication device.

16. The method of claim 11, wherein a network routing application is used to insert the first routing attribute into the request to establish the first communication session with the second communication device.

17. The method of claim 11, further comprising:
receiving, from the at least one of a first communication device and a network routing application, a request to establish a second communication session with the second communication device, wherein the request to establish the second communication session defines a second routing attribute for routing the second communication session;

looking up the second routing attribute for routing the second communication session in the dynamic routing framework; and routing the second communication session to a fourth communication device based on the second routing attribute and the one or more rules defined in the dynamic routing framework.

18. A system comprising:

a microprocessor; and a computer memory device coupled with the microprocessor and comprising microprocessor readable and executable instructions that, when executed by the microprocessor, cause the microprocessor to:

receive a request to establish a first communication session with a second communication device, wherein the request to establish the first communication session comprises a first routing attribute for routing the first communication session;

lookup the first routing attribute for routing the first communication session in a dynamic routing framework; and route the first communication session to a third communication device or destination based on the first routing attribute and one or more rules defined in the dynamic routing framework, wherein a network routing application is used to insert the first routing attribute into the request to establish the first communication session with the second communication device.

19. The system of claim 18, wherein a user interface displayed on a first communication device is used to select the first routing attribute and wherein the first routing attribute is inserted into the request to establish the first communication session with the second communication device.

* * * * *

UNITED STATES PATENT AND TRADEMARK OFFICE
CERTIFICATE OF CORRECTION

PATENT NO. : 11,108,911 B2  
APPLICATION NO. : 16/230516  
DATED : August 31, 2021  
INVENTOR(S) : Harsh V. Mendiratta and Tibor Lukac Page 1 of 1

It is certified that error appears in the above-identified patent and that said Letters Patent is hereby corrected as shown below:

In the Claims

At Column 18, Line 2, please delete "Receiving" and insert --receiving-- therein.

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*